(12) United States Patent
Taylor et al.

(10) Patent No.: US 9,906,187 B2
(45) Date of Patent: Feb. 27, 2018

(54) WINDOW ASSEMBLY AND A METHOD REGARDING THE SAME

(71) Applicant: SAGE ELECTROCHROMICS, INC., Faribault, MN (US)

(72) Inventors: Clifford Lee Taylor, Northfield, MN (US); Cody VanDerVeen, Faribault, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 14/986,897

(22) Filed: Jan. 4, 2016

(65) Prior Publication Data

US 2016/0197576 A1    Jul. 7, 2016

Related U.S. Application Data

(60) Provisional application No. 62/100,328, filed on Jan. 6, 2015.

(51) Int. Cl.
*H05K 7/02* (2006.01)
*H05K 7/04* (2006.01)
(Continued)

(52) U.S. Cl.
CPC ............... *H02S 20/22* (2014.12); *E06B 3/66* (2013.01); *E06B 5/00* (2013.01); *E06B 7/28* (2013.01);
(Continued)

(58) Field of Classification Search
USPC .......................................... 361/807, 809, 810
See application file for complete search history.

(56) References Cited

U.S. PATENT DOCUMENTS 6,001,487 A    12/1999  Ladang et al.
6,055,089 A     4/2000  Schulz et al.
(Continued)

FOREIGN PATENT DOCUMENTS

JP    2014505905 A    3/2014
WO    2013090264 A1   6/2013
(Continued)

OTHER PUBLICATIONS

International Search Report and Written Opinion for PCT Application No. PCT/US2015/035454, dated Sep. 24, 2015, 11 pages.
(Continued)

*Primary Examiner* — Hung S Bui
(74) *Attorney, Agent, or Firm* — Abel Law Group, LLP; Robert N. Young

(57) ABSTRACT

A window assembly can include an insulated glass unit, a mounting assembly moveably coupled to the insulated glass unit, and an electrical component secured to the mounting assembly. A method can include securing an electrical component to a mounting assembly, coupling the mounting assembly to an insulated glass unit, and installing the insulating glass unit in a frame. In an embodiment, after the window assembly is installed within the frame, the mounting assembly can be moved in a final position and securely fastened into position. In an embodiment, the pre-assembly can help to keep all components of a window assembly together during shipping and at the installation site to reduce the likelihood that components are separated or lost during shipping or at the installation site.

17 Claims, 5 Drawing Sheets

(51) Int. Cl.
  *H02S 20/22* (2014.01)
  *E06B 3/66* (2006.01)
  *E06B 5/00* (2006.01)
  *E06B 7/28* (2006.01)
  *E06B 9/24* (2006.01)
(52) U.S. Cl.
  CPC ........ *E06B 9/24* (2013.01); *E06B 2009/2476* (2013.01); *Y02B 10/10* (2013.01)

(56) References Cited

U.S. PATENT DOCUMENTS

| | | | |
|---|---|---|---|
| 6,119,403 A * | 9/2000 | Klippert | E05F 11/382 |
| | | | 49/375 |
| 6,406,090 B1 * | 6/2002 | Tolinski | B60J 7/043 |
| | | | 136/243 |
| 7,455,081 B2 * | 11/2008 | Bacnik | G09F 3/204 |
| | | | 40/642.02 |
| 7,715,201 B2 * | 5/2010 | Besserer | G09F 1/12 |
| | | | 361/752 |
| 2008/0009884 A1 | 1/2008 | Kennedy, II | |
| 2008/0169185 A1 | 7/2008 | Burdis et al. | |
| 2009/0009982 A1 | 1/2009 | Whitney | |
| 2009/0320896 A1 | 12/2009 | Gerhardinger | |
| 2010/0096073 A1 | 4/2010 | Adriani et al. | |
| 2010/0313501 A1 | 12/2010 | Gangemi | |
| 2011/0120528 A1 * | 5/2011 | West | F24F 5/0096 |
| | | | 136/248 |
| 2011/0167741 A1 | 7/2011 | Surace et al. | |
| 2012/0194895 A1 | 8/2012 | Podbelski et al. | |
| 2012/0317900 A1 | 12/2012 | Den Boer et al. | |
| 2013/0228989 A1 | 9/2013 | Horst | |
| 2014/0003038 A1 * | 1/2014 | Kim | F21V 33/006 |
| | | | 362/145 |
| 2014/0157696 A1 | 6/2014 | Reyher et al. | |
| 2015/0378230 A1 | 12/2015 | Gudmunson et al. | |
| 2016/0197220 A1 * | 7/2016 | Greer | E06B 9/24 |
| | | | 136/244 |

FOREIGN PATENT DOCUMENTS

| | | |
|---|---|---|
| WO | 2014032023 A1 | 2/2014 |
| WO | 2015200091 A1 | 12/2015 |
| WO | 2016111918 A1 | 7/2016 |

OTHER PUBLICATIONS

International Search Report for PCT/US2016/012026, dated May 27, 2016, 1 page.
International Search Report and Written Opinion for PCT Application No. PCT/US2015/036454, dated Sep. 24, 2015, 11 pages.

* cited by examiner

WINDOW ASSEMBLY AND A METHOD REGARDING THE SAME

CROSS-REFERENCE TO RELATED APPLICATIONS

The present application claims priority under 35 U.S.C. § 119(e) to U.S. Provisional Patent Application No. 62/100,328, filed Jan. 6, 2015, entitled "WINDOW ASSEMBLY AND A METHOD REGARDING THE SAME," naming as inventors Clifford Lee Taylor et al., which application is assigned to the current assignee hereof and is incorporated by reference herein in its entirety.

FIELD OF THE DISCLOSURE

The present disclosure is directed to window assemblies and methods regarding the same.

BACKGROUND

Window assemblies can include electrochromic materials that can change their optical properties in response to the application of an electrical potential. Such a change can make glazings within the assemblies more or less transparent or more or less reflective. The window assemblies may be coupled to one or more electrical components and installation can be complicated due to the associated electrical components. A need exists to improve the design of the window assemblies and methods of fabricating and installing the window assemblies.

BRIEF DESCRIPTION OF THE DRAWINGS

Embodiments are illustrated by way of example and are not limited in the accompanying figures.

Figure 1:
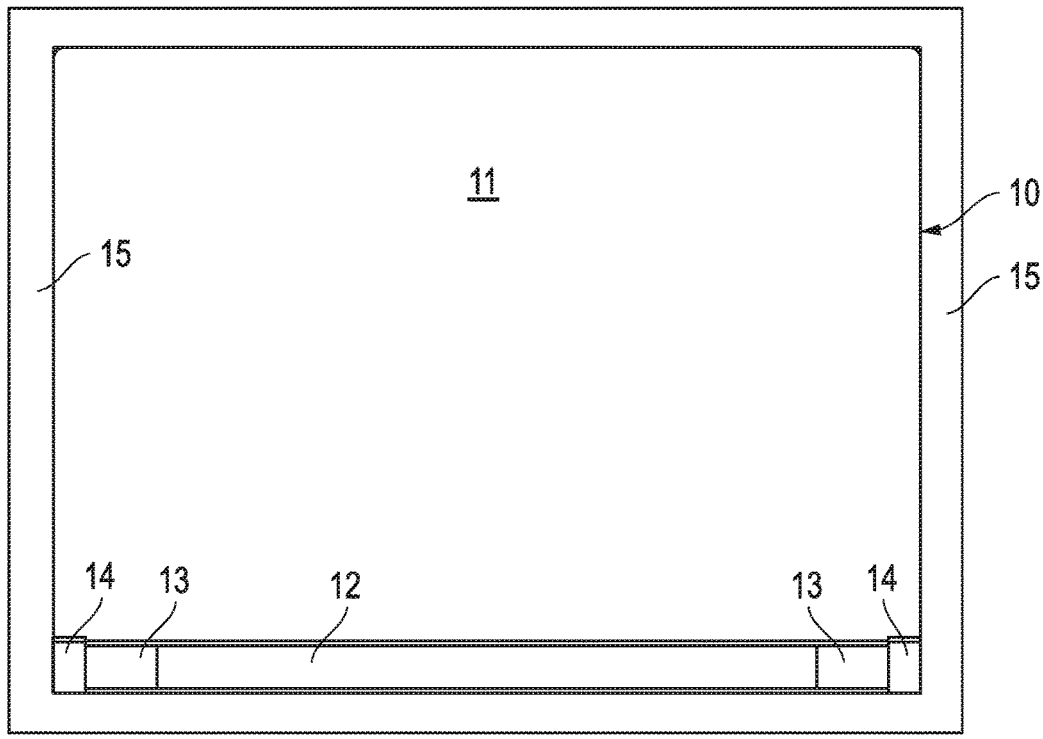
FIG. 1 includes an illustration of a fully assembled window in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the electrochromic and dynamic glass arts.

A window assembly can include an insulated glass unit, a mounting assembly moveably coupled to the insulated glass unit, and an electrical component secured to the mounting assembly. In an embodiment, the window assembly can be in a pre-assembled state such that all component parts of the window assembly are coupled to one another. Such a pre-assembled state allows the window assembly to be packaged and shipped as a single unit. Thus, the likelihood of parts becoming separated or lost during packaging, shipping, or at the installation site can be significantly reduced or eliminated.

In an aspect, a method can include securing an electrical component to a mounting assembly, coupling the mounting assembly to an insulated glass unit, and installing the insulating glass unit in a frame. In an embodiment, after the window assembly is installed within the frame, the mounting assembly can be positioned in a final position and securely fastened into position. Covers over fasteners can help to keep the window aesthetically pleasing. Furthermore, any or all space between the mounting assembly and the frame can be reduced or even eliminated. The concepts disclosed herein are better understood after considering the exemplarily methods of fabricating and installing a window assembly as illustrated and described below.

FIG. 1 includes an illustration of an installed window assembly 10 that can include an insulated glass unit (IGU) 11, a solar panel 12, covers 13, and end caps 14 installed within a frame 15. As will be discussed more fully herein, the window assembly 10 is designed to allow an electrical component, for example, the solar panel 12, to be adjusted after installation to abut or placed closer to the frame 15.

Figure 2:
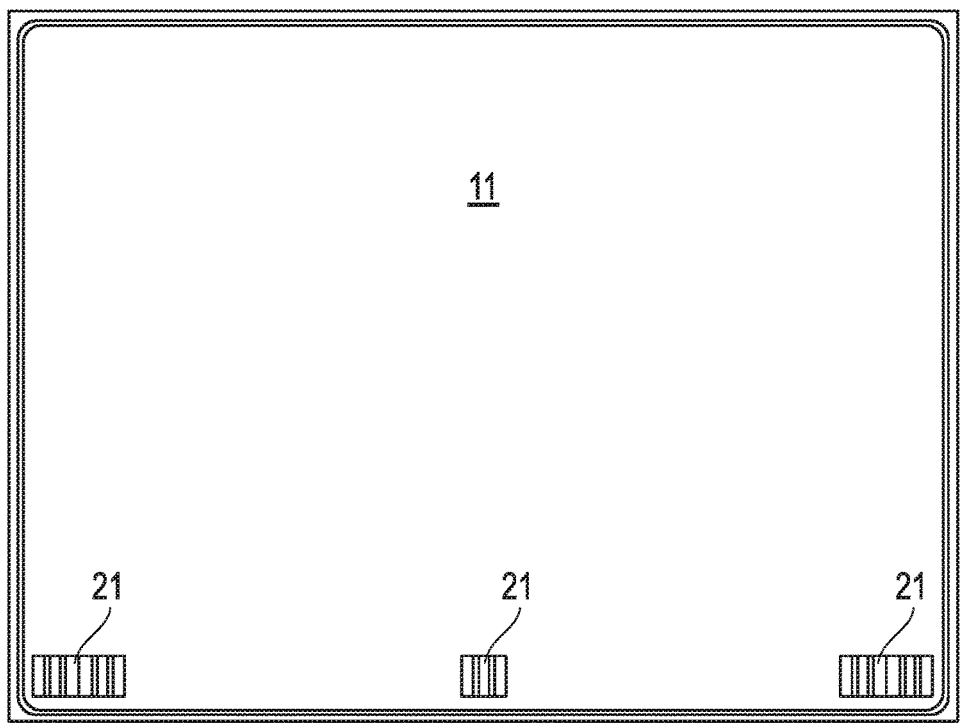
FIG. 2 includes an illustration of a front view of a partially completed window assembly including an insulated glass unit and mounting brackets.
Figure 9:
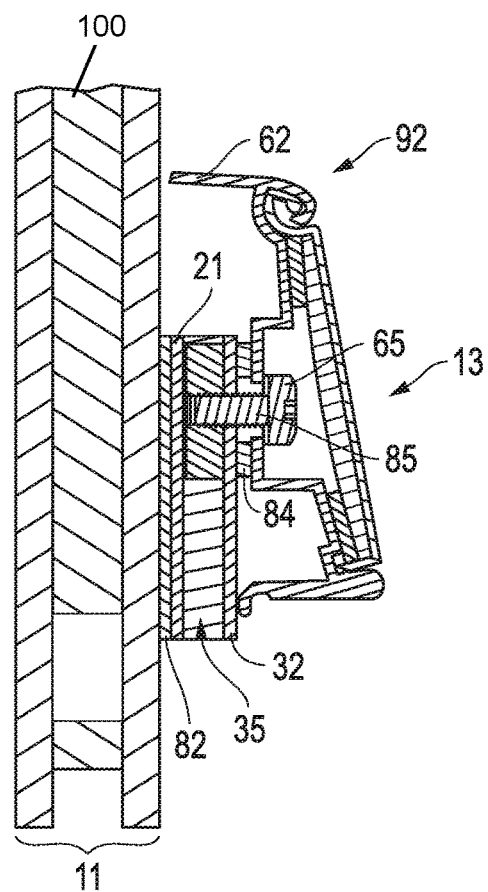
FIG. 9 includes an illustration of a cross-sectional view of the IGU, mounting bracket, mounting assembly, fastener, and cover.

FIG. 2 includes an illustration of a partially completed window assembly including the IGU 11 and mounting brackets 21. The IGU 11 can include glazings that are spaced apart from one another. Each of the glazings can include a glass, such as soda lime glass, borosilicate glass, float glass, or the like), or can include another transparent material, such as sapphire, spinel, aluminum oxide (AlON), or the like. Each glazing can be a single sheet of transparent material or a laminate. An electrochromic (EC) device can be located on a surface of one of the glazings or on a substrate that is attached to a counter substrate, which can be one of the glazings. In an embodiment, the EC device 100 is between glazings of the IGU 11, as illustrated in FIG. 9. The EC device can have its optical properties change in response to a change in of an electrical potential. Such a change can, make the IGU 11 more transparent, less transparent, more reflective, or less reflective. An EC device can include a counter electrode layer, an electrochromic layer, and an ionically conductive layer separating the counter electrode layer and the electrochromic layer. The EC device can further include two transparent conductive layers are substantially parallel to and in electrically coupled to the counter electrode layer and the electrochromic layer.

Exemplary materials for the counter electrode layer, the electrochromic material layer, the ionically conductive layer and the conductive layers are described in United States Patent Publication No. 2008/0169185, which is incorporated herein by reference in its entirety. Such materials can be substantially transparent oxides or nitrides. When an electrical potential is applied across the layered structure of the EC device, such as by connecting the respective conductive layers to a low voltage electrical source, ions, such as $Li^+$ ions in the counter electrode layer, flow from the counter electrode layer, through the ion conductor layer, and to the electrochromic layer. In addition, electrons flow from the counter electrode layer, through an external circuit to the electrochromic layer so as to maintain charge neutrality in the counter electrode layer and the electrochromic layer. The transfer of ions and electrons to the electrochromic layer causes the optical characteristics of the electrochromic layer, and optionally the counter electrode layer in a complementary EC device, to change. In a particular embodiment, the EC device changes color, the transparency, or both the color and transparency of the EC device.

The mounting brackets 21 can be secured to the IGU 11 using adhesive, screws, double sided tape, and nut and bolt assemblies). In a particular embodiment, a permanent construction adhesive is used. In another embodiment, the brackets 21 can be molded into the IGU 11, such as a glazing of the IGU 11, wherein such glazing is to be exposed to an outdoor environment. In a particular embodiment, the brackets 21 can provide an electrical connection between the solar panel 12 and an EC layer within the IGU 11 or another electrical component of the window assembly or in the frame 15, or an environmental control system of a building. The environmental control system can include the heating, ventilation, and air conditioning (HVAC) system, an interior lighting system, another suitable control system, or any combination thereof. In another particular embodiment, the brackets 21 include a material that is an insulator. Thus, the brackets 21 may include a metal or a metal alloy, such as copper, aluminum, nickel, brass, bronze, or the like, or may include a polymer, such as a polyvinyl compound, a polyurethane, a polyolefin, or the like. Such polymer may include additives or be coated to achieve a material that can withstand long-term exposure to outdoor conditions.

The number, size, and placement of the brackets 21 is selected to allow sufficient mechanical support of a mounting assembly and anything secured to the mounting assembly, such as the solar panel 12, cover 13, fasteners (not illustrated in FIG. 1 or 2) or the like. As illustrated in the embodiment of FIG. 2, three mounting brackets 21 are secured to the IGU 11.

Figure 3:
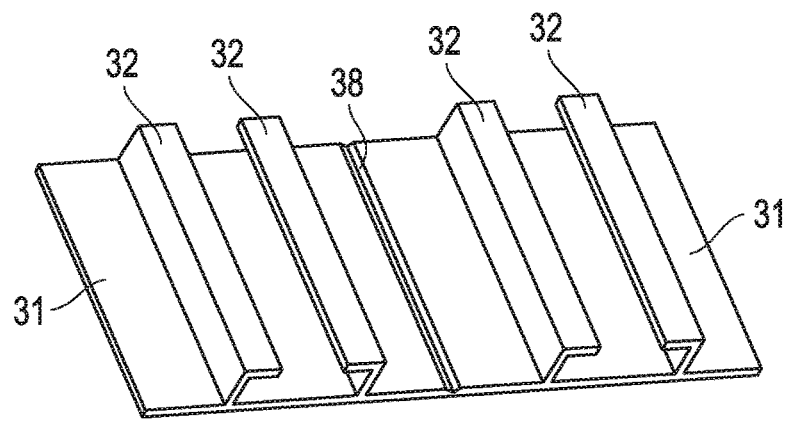
FIGS. 3, 4, and 5 include illustrations of perspective, front, and top views, respectively, of the mounting brackets of FIG. 2.
Figure 4:
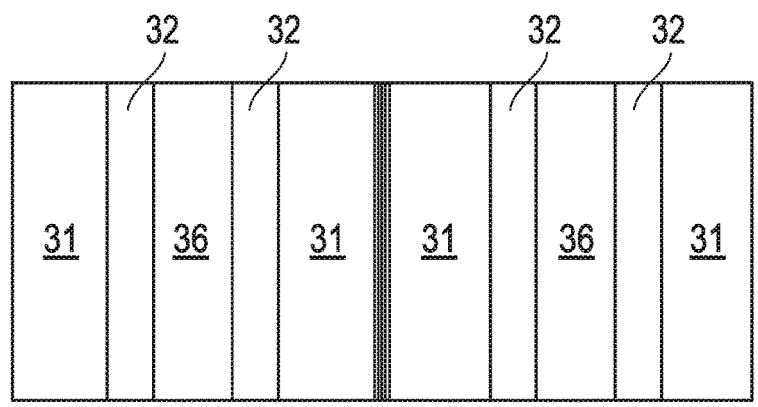
Figure 5:
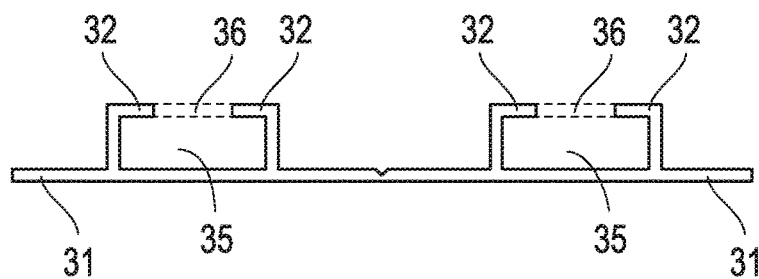

FIGS. 3 to 5 include a perspective view, a front view (when installed), and a top view (when installed) of one of the mounting bracket 21 of the IGU 11. In the embodiment illustrated, the mounting bracket 21 includes features 32 that extend away from a body 31 of the mounting brackets 21. The features 32 are used to couple the mounting assembly to the IGU 11. The side of the body 31 opposite the features 32 is secured to or molded into the IGU 11, and thus, the features 32 extend away from the IGU 11 when the mounting brackets 21 are secured or molded into the IGU 11. Each pair of the features 32 define a channel 35, and a slot 36, which the space between the upper portions of the pair of features 32 and above the channel 35. The features 32 can be used in conjunction with a fastener (not illustrated in FIGS. 3 to 5) used in fastening the mounting assembly to the mounting brackets 21.

Figure 6:
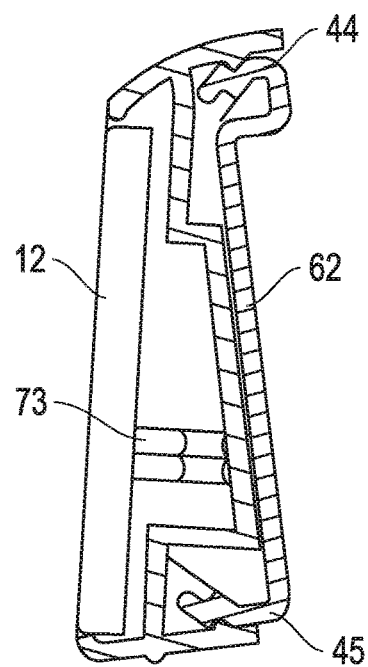
FIG. 6 includes an illustration of a cross-sectional view of a portion of a mounting assembly.

An electrical component, such as the solar panel, 12, can be secured to a mounting assembly 62, as illustrated in FIG. 6. The electrical component can be the solar panel 12, a light sensor (that may or may not be part of the solar panel), a control unit, an energy storage unit, another suitable electrical component for use with the window assembly, or any combination thereof. In an embodiment, the solar panel 12 can include a photovoltaic cell, another suitable device can that convert light or a temperature difference into energy, or any combination thereof. An exemplary solar panel that can be used is manufactured by China Solar Ltd. of ShenZhen City, China, model number KS-M33057G. In an embodiment, the energy storage unit can be a battery, a capacitor, another suitable device capable of storing energy, or any combination thereof.

The solar panel, light sensor, or both can be secured such that ambient light can reach an exposed surface. In a particular embodiment, the solar panel 12 attached to the mounting assembly 62 via double sided tape (for example, VHB-brand™ tape manufactured by 3M Company of St. Paul, Minn., USA). However, other methods of attachment are also possible (for example, adhesive, nut and bolt assemblies, rivets, welding, or the like). In another embodiment, appendages can extend over the top lip 44 and bottom lip 45 of the mounting assembly 62 to secure the solar panel 12 or other electrical component to the mounting assembly 62. The appendages provide a releasable connection to the mounting assembly 62. In this way, the solar panel 12 or other electrical component can be removed for replacement, repairs, or the like, as necessary. As illustrated, an electrical connection can be a polyimide flexible circuit 73 that extends from an edge of the solar panel 12 facing the mounting assembly 62. The polyimide flexible circuit 73 can provide the electrical connection to the EC device, energy storage unit control unit, or other electrical component secured to the mounting assembly 62 or within the building. In a finished window assembly, the control unit, the energy storage unit, and electrical connectors may not be visible and may be covered by a solar panel, light sensor, covers 13, or another component.

In operation, the control unit can be coupled to the solar panel, light sensor, energy storage unit, EC device, or, after installation, an environmental control system for a building, such as any previously described, for such building in which the window assembly is installed. In a particular embodiment, outside light conditions can be determined by the control unit in response to current of a solar panel, a signal from the light sensor, a temperature difference between inside and outside the building, or the like. The control unit can adjust the potential of the EC device to affect transmission of light or solar heat gain coefficient. In another particular embodiment, the control unit can be used to control charging and discharging of the energy storage unit. In still a further embodiment, the control unit may receive state information from the environmental control system or another source and control the EC device accordingly. For example, the control unit may allow a higher transmission, a higher solar heat gain coefficient, or both on a sunny cold day as compared to a sunny hot day. In this particular example, the temperature difference between the ambient inside and outside of the building may be used. In another application, the control unit can provide other functionality as needed or desired. After reading this specification, skilled artisans will understand that the control unit may have its functionality tailored to a particular application as needed or desired. Thus, the functionality described is merely exemplary and does not limit the scope of the appended claims.

Figure 7:
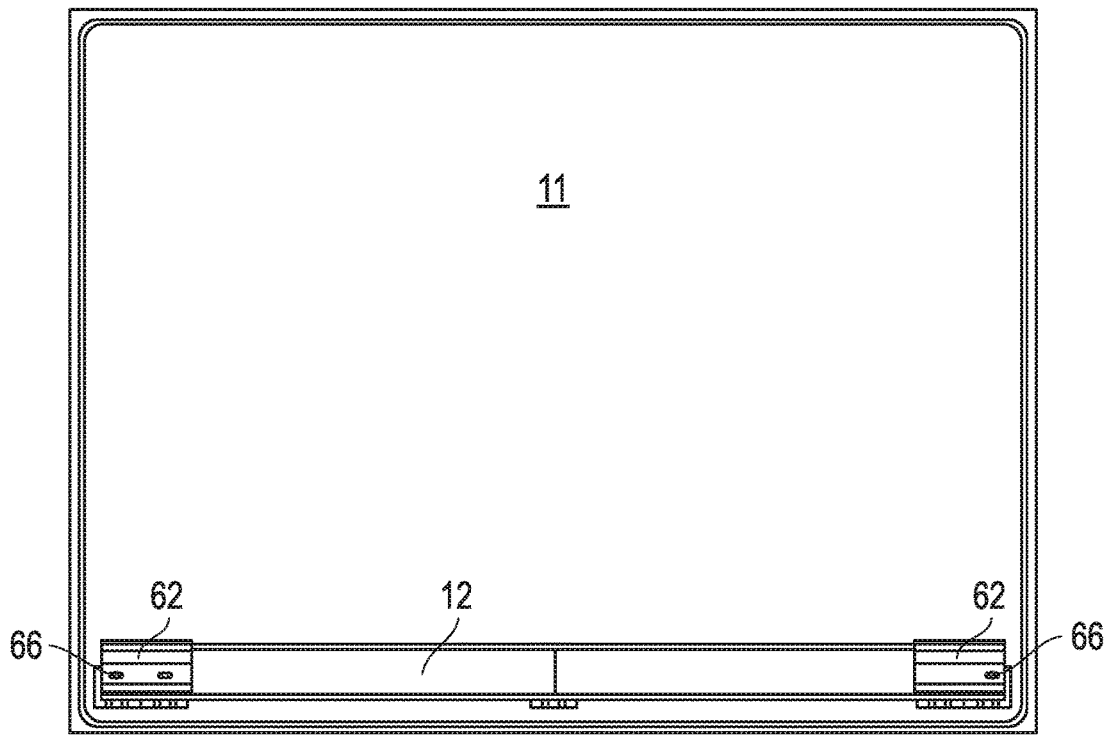
FIG. 7 includes an illustration of the partially completed window assembly after removably coupling the mounting assembly to the insulating glass unit.
Figure 8:
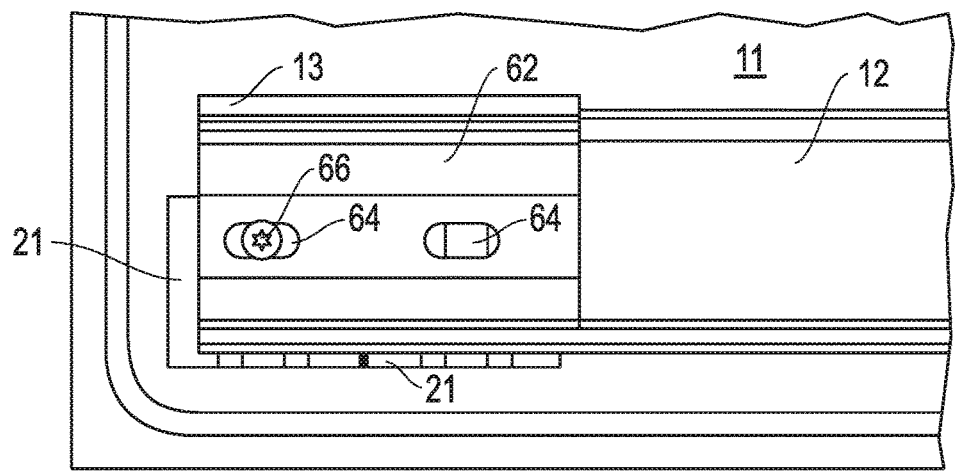
FIG. 8 includes an illustration of an enlarged portion of the view of the partially completed window assembly of FIG. 7.

FIG. 7 includes an illustration of the partially completed window assembly after a mounting assembly 62 is moveably coupled to the mounting brackets 21. FIG. 8 includes an enlarged view of a portion of the partially completed window assembly to illustrate better a portion of the mounting assembly 62. The solar panel 12, another electrical component, or any combination thereof may be secured to the mounting assembly 62 before or after moveably coupling the mounting assembly 12 to the mounting brackets 21. In the embodiment as illustrated in FIGS. 6 and 7, the solar panel 12, another electrical component, or any combination thereof is secured to the mounting assembly 62 before moveably coupling.

The mounting assembly 62 can be generally in the form of a plate. The mounting assembly 62 can include a molded or extruded material, such as any of the materials as described with respect to the mounting brackets 21. The mounting assembly 62 may include hardware, openings in the mounting assembly or other features to aid in securing electrical components, covers 13, or other components to the mounting assembly 62. The mounting assembly 62 defines openings 64. The openings 64 can have a two-dimensional shape of a circle (not elongated), elongated circle (illustrated), ellipse, rectangle (that may or may not be a square), hexagon, or another polygonal shape. The elongated circle can allow for some lateral misalignment. Further, the elongated circle may allow for expansion and contraction as the temperature changes. In a particular embodiment, the mounting assembly 62 can have a circular opening in the middle for attachment to the center mounting bracket 21, and elongated circular openings near the ends of the mounting assembly. The openings 64 may be formed before placing the mounting assembly 62 near the mounting brackets 21. In another embodiment, the locations of the slots of the mounting brackets may be marked on the mounting assembly 62, and the openings 64 can be made at locations corresponding to the markings. In a particular embodiment, the openings 64 can be drilled or punched. In the embodiment illustrated in FIGS. 7 and 8, fasteners 66 allow the mounting assembly 62 to be moveable coupled to the IGU 11.

Although not illustrated, the mounting assembly 62 may include one or more openings for electrical connectors to be made between the electrical component(s) (secured to the mounting assembly 62) and the EC device within the IGU 11, electrical connections within the building in which the window assembly will be installed, or any combination thereof.

FIG. 9 includes an illustration of a cross-sectional view of a portion of the window assembly after the mounting assembly 62 is fastened to the mounting brackets 21 and the cover 13 is placed over the fastener 66. In the embodiment as illustrated in FIG. 9, an adhesive 82 couples the mounting bracket 21 to the IGU 11. In an embodiment, the fastener 66 can be a compression fastener, which is a fastener that uses compressive force to fasten. The fastener 66 can include a bolt, a screw (illustrated in FIG. 9), a cam lever, a bayonet connector, or another suitable fastener that can help to exert compressive force between the mounting assembly 62 and the mounting bracket 21. In an embodiment, the fastener can include a nut, a spring, or another suitable part to aid in compression. A washer 84 may be used to help spread the load of the compressive force or to help keep the fastener in place. Thus, the washer 84 can be a flat washer or a lock washer. In a particular embodiment, the fastener 66 can include a stem that extends through the opening 64 in the mounting assembly 62. The window assembly can further include an anti-rattle member that can reduce rattling and be disposed between the mounting assembly 62 and the IGU 11. The anti-rattle member can be a compressive material, such as rubber or a polymer. The anti-rattle member can be in the form of an o-ring, a washer (such as washer 84), an interposer, or the like.

In the embodiment as illustrated in FIG. 9, the fastener 66 includes a screw 65, and a stem 86 of the screw 65 is inserted through the opening 64, and a washer 84 is placed around the stem, so that the mounting assembly 62 is disposed between the washer 64 and the head of the screw 65. A nut 68 is placed within the channel 35 of the mounting bracket 21, and the screw 65 is mated with the nut 68.

The cover 13 can be used to cover the fastening hardware and the mounting assembly 62. The cover 13 can be a hinged cover (with a hinge 92 as illustrated), a snap-on cover, screw-on cover, or the like. If the cover 13 has not been previously attached to the mounting assembly 62, it can be attached at this time. If it has been previously attached, the cover 13 can be moved to allow access to the opening 64 and to fasten the mounting assembly 62 to the mounting brackets 21. After fastening, the cover 13 is placed over the fastener 66.

Figure 10:
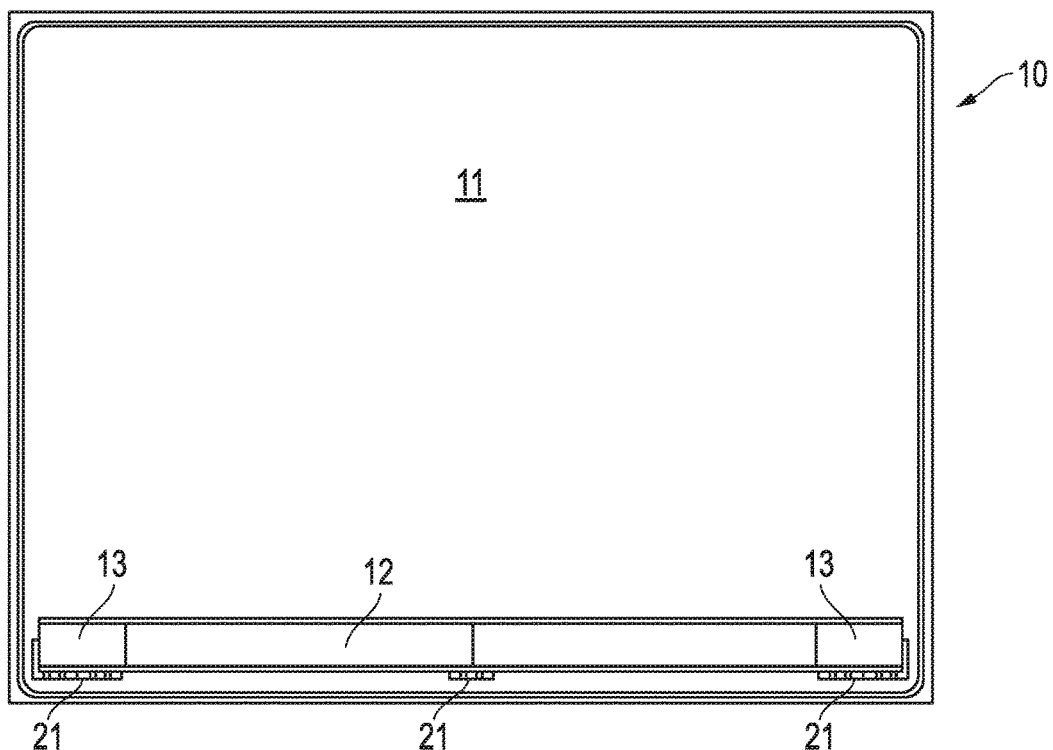
FIG. 10 includes an illustration of a front view of the window assembly during packaging and shipping in accordance with an embodiment.

At this time, the window assembly can be packaged, shipped from the fabrication facility to the location where the window assembly will be installed. FIG. 10 includes an illustration of a front view of the window assembly in its state when shipped. Because the electrical components and mounting assembly are attached to the window assembly, the window assembly can be shipped as a single unit, fully pre-assembled. The mounting assembly 62 and electrical components do not need to be shipped separately or as different units within the same package. Thus, there is a lower likelihood that the IGU 11 will become separated from the mounting assembly 62 or corresponding electrical components before or at the time of installation. However, in another embodiment, the mounting brackets 21, mounting assembly 62, electrical components, or any combination thereof may be shipped as separate units in the same package or within different packages, should a customer so request.

Depending on the application, the package may be shipped a relatively short distance or a very long distance. In an embodiment, the distance can be at least 11 km, at least 50 km, at least 110 km, or at least 500 km, and in another embodiment, the distance may be no greater than 90 million km, no greater than 9 million km, no greater than 25,000 km, or no greater than 9000 km, or no greater than 5000 km. In a particular embodiment, the distance is in a range of 11 km to 25,000 km, 50 km to 9000 km, or 110 km to 5000 km. If the window assembly will be used on Earth, the distance will likely be no greater than 25,000 km. If the window assembly will be used in a space vehicle, the distance may be greater than 25,000 km, and, in many instances, will be no greater than 90 million km. Many times the fabrication facility and installation site are on the same continent, so the distance may be no greater than 9000 km or 5000 km. Special shipping precautions may not be required for the relatively shorter distances (less that 50 km or even less than 11 km).

Figure 11:
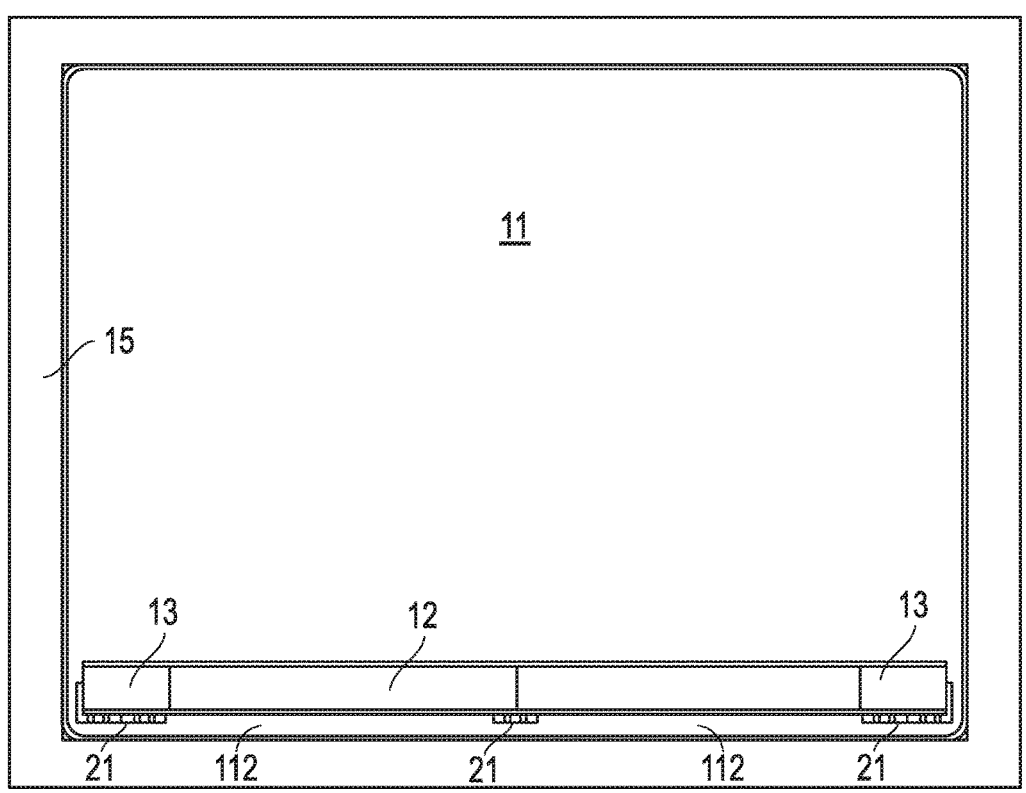
FIG. 11 includes an illustration of a front view of the window assembly after installation into a frame.

The window assembly 10 is installed within the frame 15, as illustrated in FIG. 11. The mounting assembly 62 extends along at least 70%, at least 80%, or at least 90% of the length of the closest member of the frame 15. During installation, electrical connections may be made between the building's electrical system and any one or more of the electrical components of the window assembly 10 if needed or desired. Alternatively, wireless communication can be established between a transmitter or transceiver within the building and any one or more of the electrical components of the window assembly 10. In another embodiment, an inductive power source may be coupled to the control unit or an energy storage unit that drives the EC device of the window assembly 10. Still further, the window assembly 10 may have self-contained electrical components that do not need a power or communications interface with the building's electrical system.

After installed, a space 112 may exist between the solar panel 12 and frame 15. The space 112 helps to compensate for varying tolerances associated with window framing systems. The space 112 may be reduced or eliminated after the window assembly 10 is installed within the frame 15. The cover 13 is moved to expose the fasteners, such as previously described with respect to FIGS. 7 and 8. If the covers 13 are hinged covers, the covers can be moved about the hinges. Otherwise, the covers 13 can be removed. The fasteners can be loosened and the mounting assembly 62 can be positioned to its final position. Typically, the mounting assembly 62 is moved closer to the frame 15 or an outer edge of the IGU 11, wherein such outer edge is closest to the mounting assembly 62. In an embodiment, the mounting assembly 62 is moved such it abuts the frame 15. In another embodiment, the mounting assembly 62 is moved closer to but remains spaced-apart from the frame 15. Such a configuration may be useful if the coefficient of thermal expansion between the frame 15 and the mounting assembly 62 are significantly different, or if water drainage is a concern. The fasteners are tightened once the mounting assembly 62 is in its final position, and the covers 13 are used to cover the fasteners. If needed or desired, end caps 15 may be used to cover spaces between ends of the mounting assembly 62 and the frame 15. Thus, the installed window assembly 10 with the positioned mounting assembly is illustrated in FIG. 1.

Embodiments described herein have benefits over conventional systems. The pre-assembly of the mounting assembly allows the IGU 11 and mounting assembly 62 and its corresponding electrical component to be shipped as a unit. This can reduce the likelihood of parts becoming separate or lost during shipment or at the installation site. Furthermore, the pre-assembly of the window assembly 10 allows the window assembly 10 to be installed more readily, as compared to a window assembly 10 if the mounting assembly 62 would have in a fixed, non-moveable position. The fasteners help to retain securely the mounting assembly 62 and the associated electronic component(s), so that parts are less likely to be separated or lost during shipping or at the installation site.

The moveable coupling between the mounting assembly 62 and the mounting brackets 21 allow the window assembly to be installed and have a clean, professionally installed look. If the mounting assembly 62 would be fixed and not moveably coupled, the installation would be much more difficult as shims or other positioning members may be required during installation. Thus, the window assembly 10 allows installation to be easier as compared to a fixed position mounting assembly 62.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A window assembly comprising:
an insulated glass unit;
a mounting assembly moveably coupled to the insulated glass unit; and
an electrical component secured to the mounting assembly.

Embodiment 2

A method comprising:
securing an electrical component to a mounting assembly;
coupling the mounting assembly to an insulated glass unit; and
installing the insulating glass unit in a frame.

Embodiment 3

The method of Embodiment 2, wherein coupling the mounting assembly comprises fastening the mounting assembly to a mounting bracket associated with the insulated glass unit.

Embodiment 4

The method of Embodiment 3, wherein coupling the mounting assembly comprises securing the mounting bracket to the insulated glass unit.

Embodiment 5

The method of any one of Embodiments 2 to 4, further comprising positioning the mounting assembly so that it is closer to the frame after positioning as compared to before positioning, wherein positioning is performed after installing.

Embodiment 6

The method of Embodiment 5, further comprising:
loosening a fastener that is used to fasten the mounting assembly to the mounting bracket, wherein loosening is performed after installing the insulated glass unit and before positioning the mounting assembly; and
tightening the fastener after positioning the mounting assembly.

Embodiment 7

The method of Embodiment 5 or 6, wherein positioning comprises moving the mounting assembly and electrical component toward the frame.

Embodiment 8

The method of any one of Embodiments 2 to 7, further comprising electrically coupling the electrical component to the insulated glass unit.

Embodiment 9

The method of any one of Embodiments 2 to 8, further comprising placing a cover over a fastener after installing the insulated glass unit.

Embodiment 10

The method of Embodiment 9, wherein placing the cover is performed after positioning the mounting assembly.

Embodiment 11

The method of Embodiment 10, furthering comprising moving the cover to expose the fastener before loosening and tightening the fastener.

Embodiment 12

The method of any one Embodiments 2 to 11, further comprising shipping the window assembly from a first location to a second location where installation is to be performed.

Embodiment 13

The method of Embodiment 12, wherein a distance between the first and second locations is at least 11 km, at least 50 km, at least 110 km, or at least 500 km.

Embodiment 14

The method of Embodiment 12 or 13, wherein the distance between the first and second locations is no greater than 90 million km, no greater than 9 million km, no greater than 25,000 km, or no greater than 9000 km, or no greater than 5000 km.

Embodiment 15

The method of any one of Embodiments 12 to 14, wherein a distance between the first and second locations is in a range of 11 km to 25,000 km, 50 km to 9000 km, or 110 km to 5000 km.

Embodiment 16

The method of any one of Embodiments 12 to 15, further comprising:
placing the window assembly into a package before shipping; and
removing the window assembly from the package after shipping and before installing.

Embodiment 17

The method of any one of Embodiments 12 to 16, wherein shipping the window, placing the window assembly into the package, removing the window assembly from the package, or any combination thereof is performed while the mounting assembly is coupled to the insulated glass unit.

Embodiment 18

The window assembly or method of any one of the preceding Embodiments, wherein the insulated glass unit comprises an electrochemical system.

Embodiment 19

The window assembly or method of Embodiment 19, wherein the electrochemical system is an electrochromic device.

Embodiment 20

The window assembly or method of any one of Embodiments 1 to 11, wherein the electrical component comprises a solar panel.

Embodiment 21

The window assembly or method of Embodiment 20, wherein the solar panel generates energy for an electrochemical system that is part of the insulated glass unit.

Embodiment 22

The window assembly or method of Embodiment 20 or 21, wherein the window assembly further comprises an energy storage unit configured to receive energy from the solar panel.

Embodiment 23

The window assembly or method of any one of the preceding Embodiments, wherein the electrical component comprises a control unit.

Embodiment 24

The window assembly or method of Embodiment 23, wherein the control unit is coupled to a solar panel.

Embodiment 25

The window assembly or method of Embodiment 23 or 24, wherein the control unit is coupled to an electrochemical system within the insulated glass unit.

Embodiment 26

The window assembly or method of any one of Embodiments 1 to 22, wherein the window assembly further comprises a control unit coupled to an electrochemical system, the electrical component, or both.

Embodiment 27

The window assembly or method of Embodiment 26, wherein the control unit is within the frame or within a housing attached to the frame or insulated glass unit.

Embodiment 28

The window assembly or method of any one of Embodiments 1 to 5 and 7 to 27, wherein the window assembly further comprising a fastener to couple the mounting assembly to the insulated glass unit.

Embodiment 29

The window assembly or method of Embodiment 6 or 28, wherein the fastener is a compression fastener.

Embodiment 30

The window assembly or method of Embodiment 6, 28, or 29, wherein the fastener comprises a bolt, a screw, a cam lever, or a bayonet connector.

Embodiment 31

The window assembly or method of Embodiment 30, wherein the fastener further comprises a nut.

Embodiment 32

The window assembly or method of any one of Embodiments 1, 2, 5, and 12 to 31, wherein the window assembly further comprising a mounting bracket secured to the insulated glass unit.

Embodiment 33

The window assembly or method of Embodiment 32, further comprising adhesive, a screw, double sided tape, or a nut-and-bolt assembly that secures the mounting bracket to the insulating glass unit.

Embodiment 34

The window assembly or method of any one of Embodiments 1, 2, 5, and 12 to 31, further comprising a mounting bracket molded to the insulated glass unit.

Embodiment 35

The window assembly or method of any one of Embodiments 32 to 34, wherein the mounting bracket has a channel.

Embodiment 36

The window assembly or method of any one of the preceding Embodiments, wherein the window assembly comprises at least 2, at least 3, at least 4, or at least 5 mounting brackets.

Embodiment 37

The window assembly or method of any one of the preceding Embodiments, wherein the mounting assembly includes a plate.

Embodiment 38

The window assembly or method of any one of Embodiments 1 to 8 and 12 to 37, wherein the window assembly further comprises a cover that is adjacent and covers a portion of the mounting assembly.

Embodiment 39

The window assembly or method of any one of Embodiments 9 to 11 and 38, wherein the cover is a trim panel that covers a portion of the mounting assembly that is not covered by the electrical component.

Embodiment 40

The window assembly or method of any one of Embodiments 9 to 11, 38, and 39, wherein the cover is a hinged cover.

Embodiment 41

The window assembly or method of any one of Embodiments 9 to 11 and 38 to 40, wherein the cover has a main body that is an extruded piece of material.

Embodiment 42

The window assembly or method of any one of Embodiments 9 to 11 and 38 to 42, wherein the cover comprises aluminum or a polymer.

Embodiment 43

The window assembly or method of any one of the preceding Embodiments, wherein the mounting assembly includes an opening in a form of an elongated circle.

Embodiment 44

The window assembly or method of Embodiment 43, wherein the mounting assembly further includes another opening in a form of a circle that is not elongated and is closer to a center of the mounting assembly as compared to the opening in the form of the elongated circle.

Embodiment 45

The window assembly or method of any one of one of the preceding Embodiments, further comprising an anti-rattle member disposed between the insulated glass unit and the mounting assembly.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A window assembly comprising:
   an insulated glass unit;
   a mounting assembly moveably coupled to the insulated glass unit; and
   an electrical component secured to the mounting assembly; and
   a fastener to couple the mounting assembly to the insulated glass unit, wherein the fastener comprises a bolt, a screw, a cam lever, or a bayonet connector.

2. The window assembly of claim 1, wherein the insulated glass unit comprises an electrochemical system.

3. The window assembly of claim 1, wherein the electrical component comprises a solar panel.

4. The window assembly of claim 3, wherein the window assembly further comprises an energy storage unit configured to receive energy from the solar panel.

5. The window assembly of claim 1, wherein the electrical component comprises a control unit.

6. The window assembly of claim 5, wherein the control unit is coupled to a solar panel, an energy storage unit, an electrochemical system within the insulated glass unit, or any combination thereof.

7. The window assembly of claim 1, wherein the window assembly further comprising a mounting bracket secured to the insulated glass unit.

8. The window assembly of claim 7, further comprising adhesive, a screw, double sided tape, or a nut-and-bolt assembly that secures the mounting bracket to the insulating glass unit.

9. The window assembly of claim 1, further comprising an anti-rattle member disposed between the insulated glass unit and the mounting assembly.

10. A method comprising:
    securing an electrical component to a mounting assembly;
    coupling the mounting assembly to an insulated glass unit using a fastener that comprises a bolt, a screw, a cam lever, or a bayonet connector; and
    installing the insulating glass unit in a frame.

11. The method of claim 10, further comprising positioning the mounting assembly so that it is closer to the frame after positioning as compared to before positioning, wherein positioning is performed after installing.

12. The method of claim 11, further comprising:
    loosening a fastener that is used to fasten the mounting assembly to a mounting bracket, wherein loosening is performed after installing the insulated glass unit and before positioning the mounting assembly; and
    tightening the fastener after positioning the mounting assembly.

13. The method of claim 10, wherein the insulated glass unit comprises an electrochemical system.

14. The method of claim 10, wherein the electrical component comprises a solar panel.

15. The method of claim 10, wherein the window assembly further comprises an energy storage unit configured to receive energy from the solar panel.

16. The method of claim 10, wherein the electrical component comprises a control unit.

17. The method of claim 16, wherein the control unit is coupled to a solar panel, an energy storage unit, an electrochemical system within the insulated glass unit, or any combination thereof.

* * * * *